Patented May 20, 1941

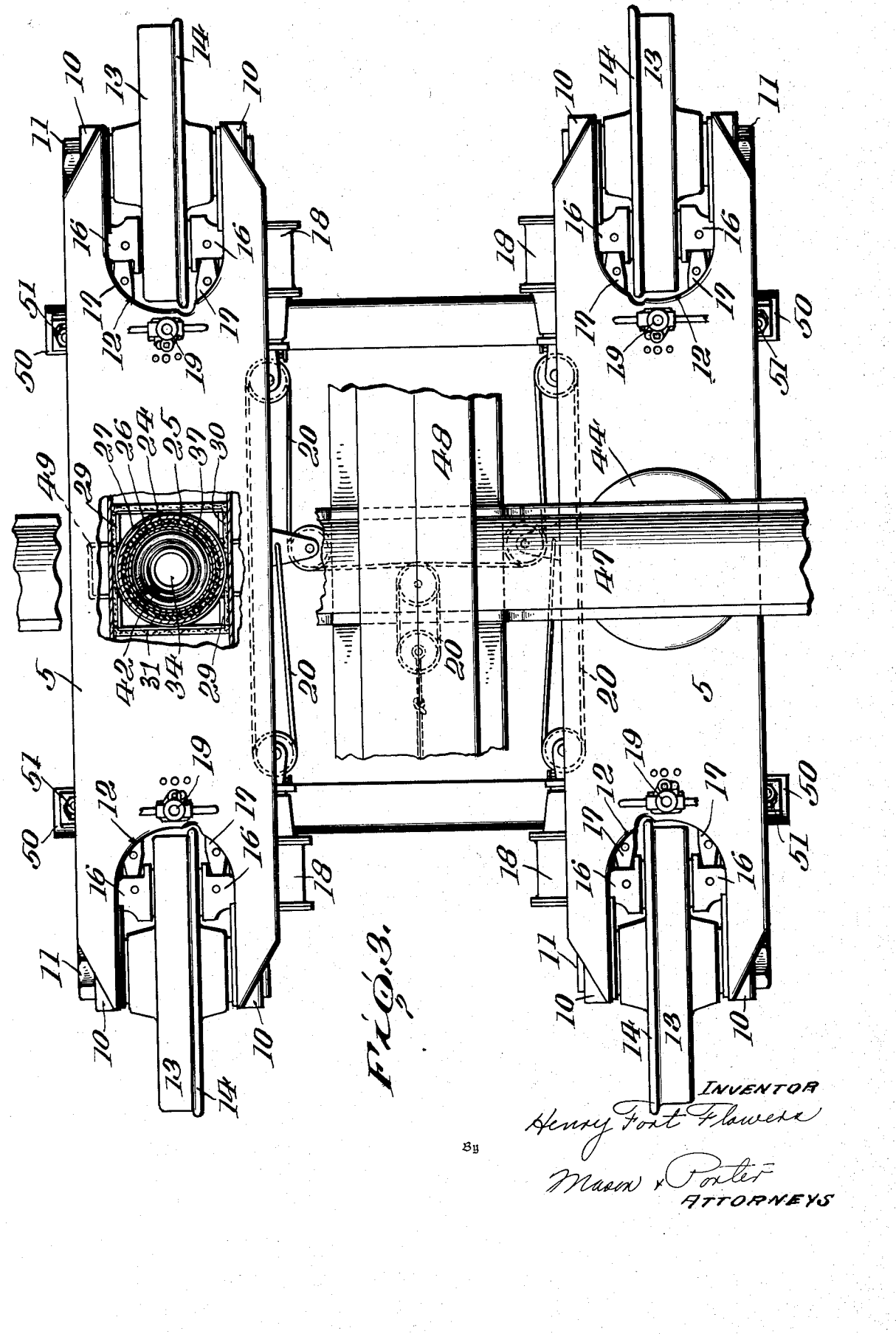

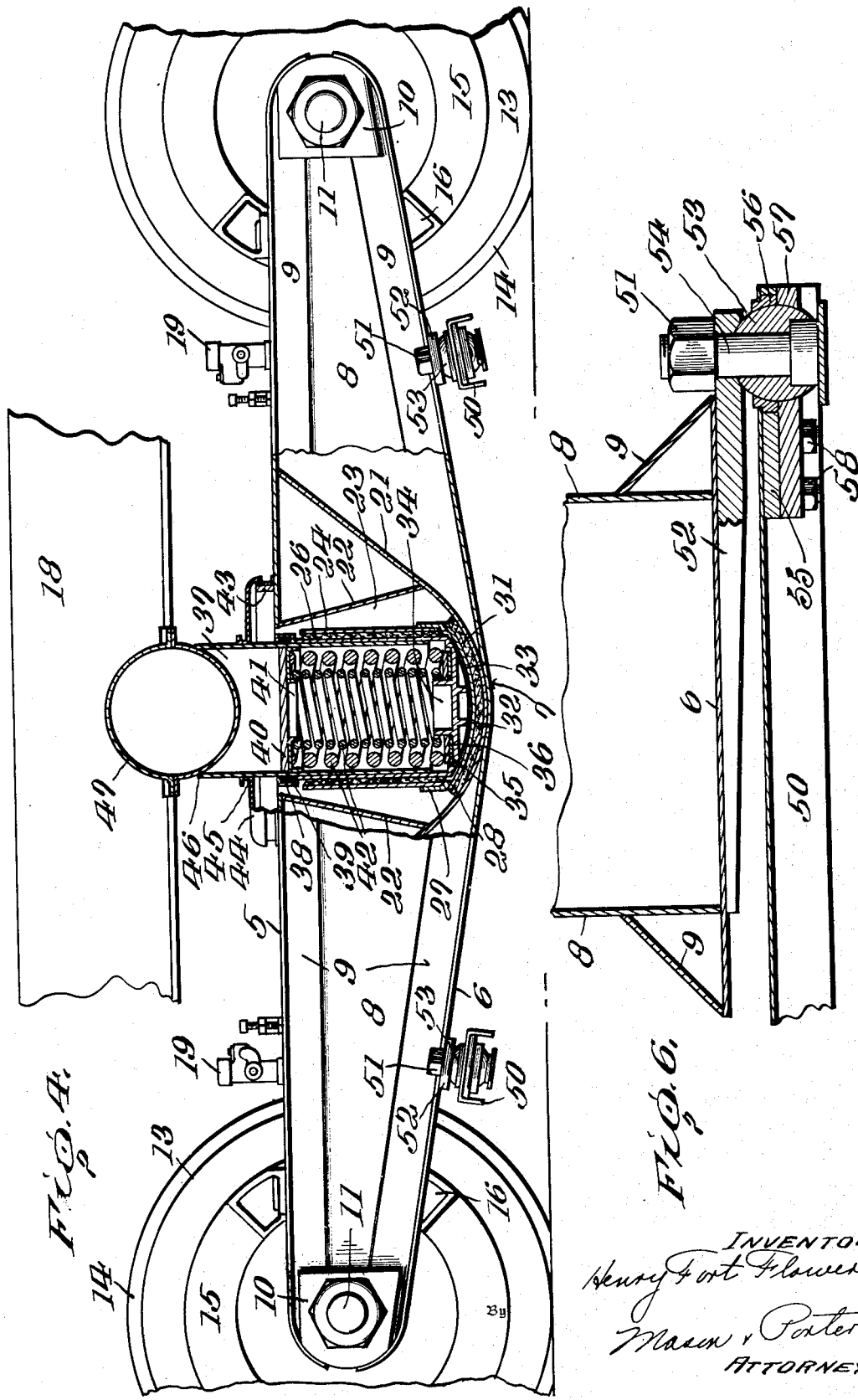

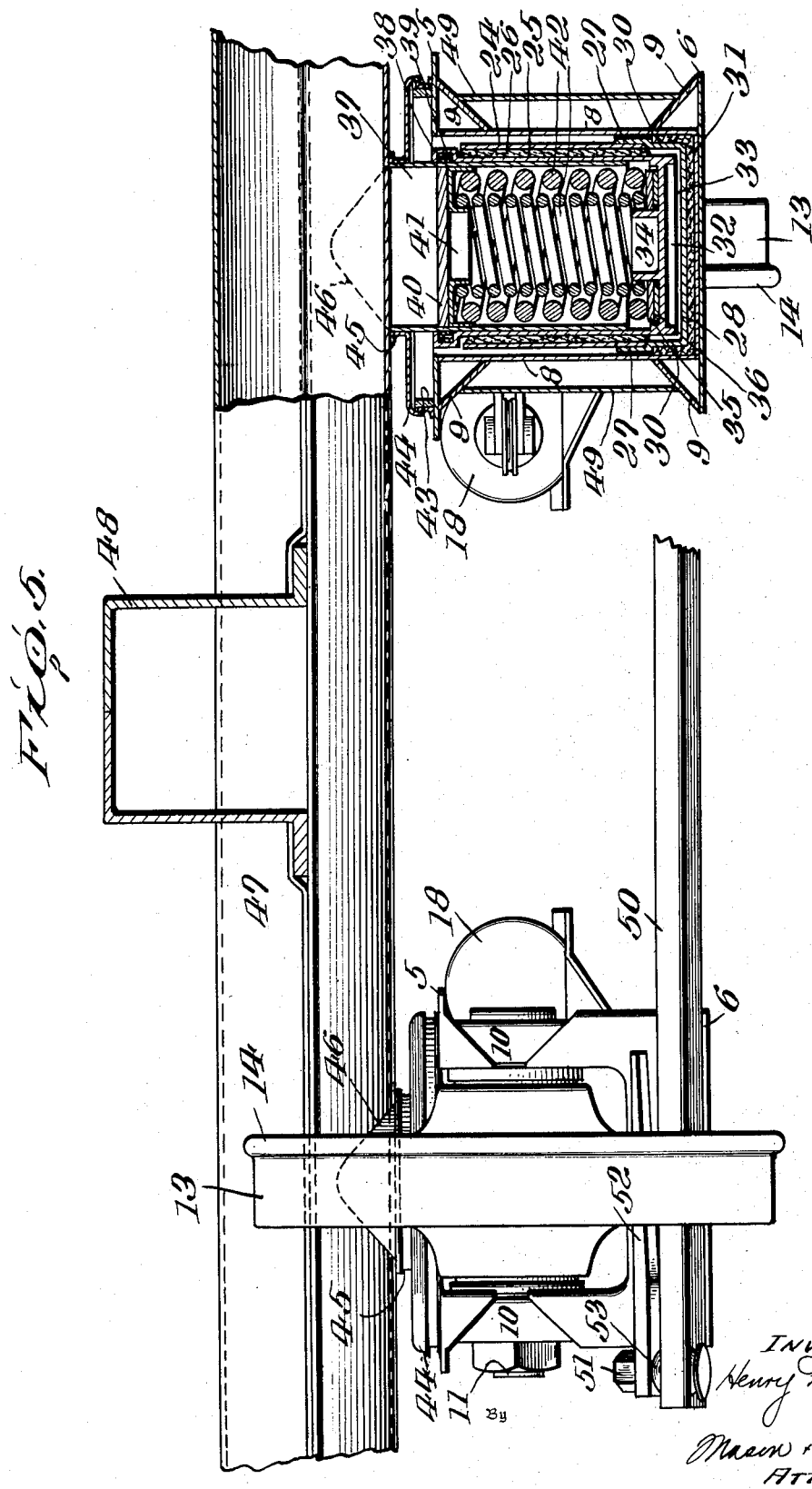

2,242,851

UNITED STATES PATENT OFFICE 2,242,851

TANDEM WHEEL TRUCK STRUCTURE

Henry Fort Flowers, Findlay, Ohio

Application May 20, 1939, Serial No. 274,846

7 Claims. (Cl. 105—179)

The invention relates generally to tandem wheel truck structures of the type disclosed in U. S. Letters Patent 2,063,545 and 2,078,915, issued on December 8, 1936, and April 27, 1937, respectively, to Henry Fort Flowers, and primarily seeks to provide certain new and useful improvements in such truck structures intended to minimize the problems resulting from the tendency toward foreshortening or the narrowing of the wheel gage during the rounding of track curves.

It has been the practice, heretofore, in manufacturing truck structures of the character stated, to connect each pair of truck elements by a cross tie member so that the truck elements would retain the desired substantially parallel relation while pivoting about their individual vertical king post axes in the rounding of track curves. These tie bars were pivotally connected to the individual truck elements at points inside the track gage lines, and thus were shorter in length than the width of the track gage or the distance between the king post centers of the particular truck. This was found to be objectionable because in the rounding of track curves the wheel gage tended to become narrower than the track gage and resulted in the obviously objectionable drawing of the wheel flanges inwardly away from the rails.

The invention therefore has for an object to provide means tending to spread the truck elements during the rounding of track curves so as to cause the wheel gage and the track gage to more nearly coincide and thus reduce to a minimum the problems of foreshortening or the narrowing of wheel gage relatively to the track gage.

In its more detailed nature the invention resides in providing each truck element with a pivotal or king post mounting capable of a degree of lateral movement, thus enabling the truck elements to be spread apart or separated a greater than normal amount during the rounding of curves, and cross tie equipments pivotally connected with the truck elements outwardly of the track gage lines whereby said tie bars will force the truck elements apart during the rounding of curves and serve to compensate for the objectionable foreshortening tendency and cause the wheel gage and track gage lines to more nearly coincide than has been possible heretofore.

Another object of the invention is to provide a novel pivotal support for the tie bars.

Another object of the invention is to provide a novel king post mounting structure.

With the above and other objects in view that will hereinafter appear, the nature of the invention will be more clearly understood by following the detailed description, the appended claims, and the several views illustrated in the accompanying drawings.

In the drawings,

Figure 3 is a plan view of a truck structure embodying the invention, one king post being shown in horizontal section.

Figure 4 is a side elevation of the parts shown in Figure 3, one king post structure being shown partially in section.

Figure 5 is an end view and part vertical section.

Figure 6 is an enlarged fragmentary section illustrating one of the pivotal connections of the tie bar.

Figure 1:
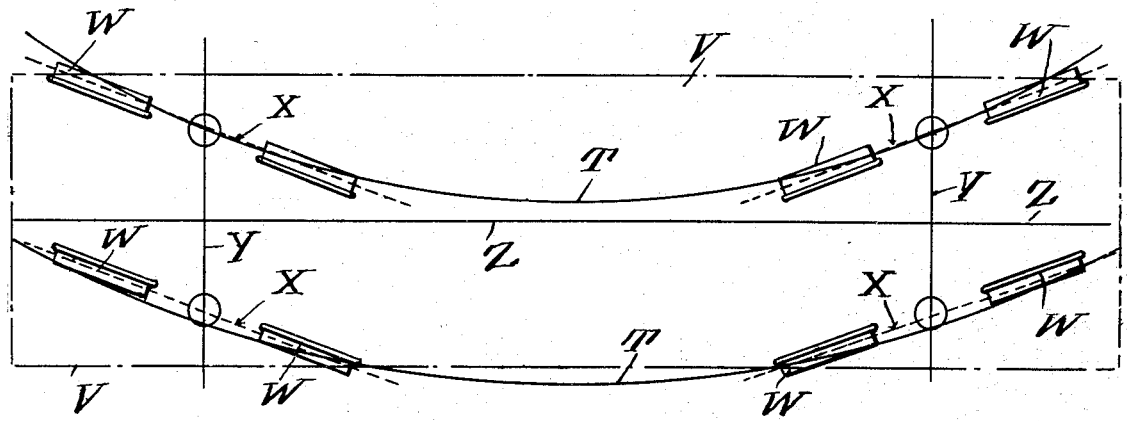
Figure 1 is a diagrammatic plan view, illustrating a car equipped with tandem wheel trucks negotiating a sharp curve.

In the drawings, in Figure 1, I have diagrammatically illustrated a car or vehicle equipped with my improved form of tie bar connected tandem wheel truck elements negotiating a sharp curve, and in Figure 2 I have similarly illustrated the effect of providing the novel tie bar and king post mountings hereinafter described in detail. In these diagrammatic illustrations the track gage lines are indicated at T, and the tandem mounted wheels at W. The individual truck elements are indicated by the plane lines X, the king post connecting bolsters by the parallel lines Y, the car center beam by the line Z, and the car outline is indicated at V.

In the practical development of the invention, each truck element or unit preferably is fabricated from steel plating suitably welded together. In the example of embodiment herein disclosed, each truck element includes a horizontally disposed upper plating 5 and opposed lower plating 6 spaced from the upper plating and having a lower central point 7 and converging upwardly in the fore and aft direction toward said upper plating. The sides of each truck element are closed by a suitably spaced side plating 8, and the side and top and bottom plating is suitably reinforced by angle plates 9 welded to said plating.

Bearing boxes 10 are secured in spaced relation at each end of each truck element, and each pair of such boxes serves to support a stub axle 11 on which a wheel W is rotatably mounted. Each wheel is accommodated in bifurcations 12 in the plating 5 and 6 and includes a tread surface 13, the usual flange 14 and laterally disposed brake ring portions 15.

The brake ring portions 15 are opposed by arcuate brake shoes 16 controlled by suitable actuator devices generally designated 17 and to which movement can be applied by application of fluid pressure, through the brake cylinder equipments generally designated 18 under automatic torque control through the medium of pressure control devices generally designated 19, or manually through suitable tackle generally designated 20. It is to be understood that the specific construction of the wheels, of the brake equipment, and of the brake equipment controlling devices forms no part of the present invention, and further detailed description thereof herein is deemed unnecessary.

Each truck element also includes central cradle plating 21 and well plating 22 spaced in the fore and aft direction with respect to the geometrical vertical center of the truck element and tilted upwardly and inwardly in a manner for forming a gimbal well 23 having enlargements or clearances in the bottom and in the fore and aft direction, as is best shown in Figure 4 of the drawings.

The well 23 accommodates the positioning of a gimbal structure composed of an outer shell or sleeve 24 and an inner shell or sleeve 25 concentric with and spaced a considerable distance inwardly of the outer sleeve. The sleeves 24 and 25 are separated by a live rubber cushion or sleeve 26 which is interposed between and vulcanized to said sleeves. This rubber sleeve allows the inner sleeve 25 to partake of a considerable amount of vertical and lateral movement within the outer sleeve 24.

The outer sleeve 24 is mounted on a support ring 27 which is secured on and extends upwardly from a supporting plate 28 which is flat in transverse cross section, as illustrated in Figure 5 of the drawings, and arcuate in longitudinal cross section to conform to the curvature of the central portion of the cradle plating 21, as illustrated in Figure 4 of the drawings. The plate 28 includes upstanding laterally presented edge portions 29 which straddle a part of the ring 27 and oppose the upturned side flange portions 30 of a rubber mat 31 which is interposed between the plate 28 and the cradle plating 21. The rubber mat 31 may be vulcanized to the plate 28 but is capable of slippage on the cradle plating 21 during movement of the truck elements over rough road beds.

The inner sleeve 25 has a bottom portion 32 spaced as at 33 above the plate 28 so that the inner sleeve 25 is free to move up and down within the outer sleeve 24 and on the rubber sleeve mounting 26. It will be noted, however, that the spacing 33 is slight, and the bottom 32 may contact the plate 28 as a result of heavy road shocks incident to travel over rough road beds or in case of fatigue of the resilient supporting sleeve 26.

The bottom 32 includes a center boss 34 which is surrounded by a spring thrust ring 35 and a slip ring 36 underlying the thrust ring. A king post sleeve 37 is telescopically mounted in the inner sleeve 25 and extends upwardly through the well 23 and through an annular gland 38 weld-secured to the sleeve 25 and having a U-shaped fluid pressure sealing gasket 39 seated therein. Each king post also includes an abutment partition 40 opposed by a cup ring 41, and an equipment of nested compression springs 42 is interposed between each cup ring 41 and the underlying thrust ring 35.

An annular grooved mounting ring 43 is carried by each truck element top plating 5 in position for surrounding the respective king post well 23, and this ring is encircled by a flexible dust guard 44 which grips the king post sleeve 37 as at 45. The king post sleeves 37 of each complementary pair of truck elements or units are secured as at 46 to a cross bolster 47 which may comprise a cylindrical body formed of flange-secured half portions. The cross bolsters secure the complementary pairs of truck elements in generally parallel spaced relation, and the bolsters of each car are secured in longitudinally spaced relation by a suitable center beam structure 48 which is mounted upon and secured in any approved manner to the bolsters in the manner illustrated in Figures 4 and 5 of the drawings.

If desired, each truck element may be reinforced at each side of its king post equipment by suitable vertically disposed gusset elements 49.

In car structures of the nature herein disclosed in which are included individual laterally spaced truck elements each carrying a pair of wheels disposed in tandem relation and mounted upon stub axles, the truck elements, because of the individual pivotal mounting thereof on rigid bolsters which must remain in parallel spaced relation during the negotiation of curves, are relatively closer one to another during the rounding of curves than during straightaway travel and this results in a tendency to draw the wheel flanges away from the rails and has the effect of foreshortening the wheel gage with respect to the track gage. It is the purpose of the present invention to provide means tending to spread the truck elements and compensate for this foreshortening tendency. To this end, tie bar structures are provided and connected in a novel manner to the complementary truck elements. A tie bar is connected across the truck elements toward the end of each complementary pair thereof. Each tie bar preferably comprises an inverted channel member 50 which is pivotally connected as at 51 to each truck element of a complementary pair of truck elements at a point outside the track gage line in the manner illustrated in Figures 2 to 6 of the drawings.

The pivotal mountings of the tie bars generally designated 51 preferably are in the nature of ball and socket joints. To this end a reinforce bar 52 is secured in any suitable manner, as by welding, to the under surface of the bottom plating 6 at the respective end of each truck element and just inwardly of the wheel at said end. A pivot ball 53 is bolt-secured as at 54 to each bar 52, and at each of its ends each tie bar is equipped with a reinforcing element 55 which is recessed to receive a replaceable shouldered socket half 56 which is opposed by a socket member 57 bolted as at 58 to the respective reinforcing member 55. The opposed socket members 56 and 57 at each end of each tie bar embrace and have a degree of universal movement on one of the pivot ball members 53. The tie bar members thus connected across between the truck elements cause said elements to move in unison.

Figure 2:
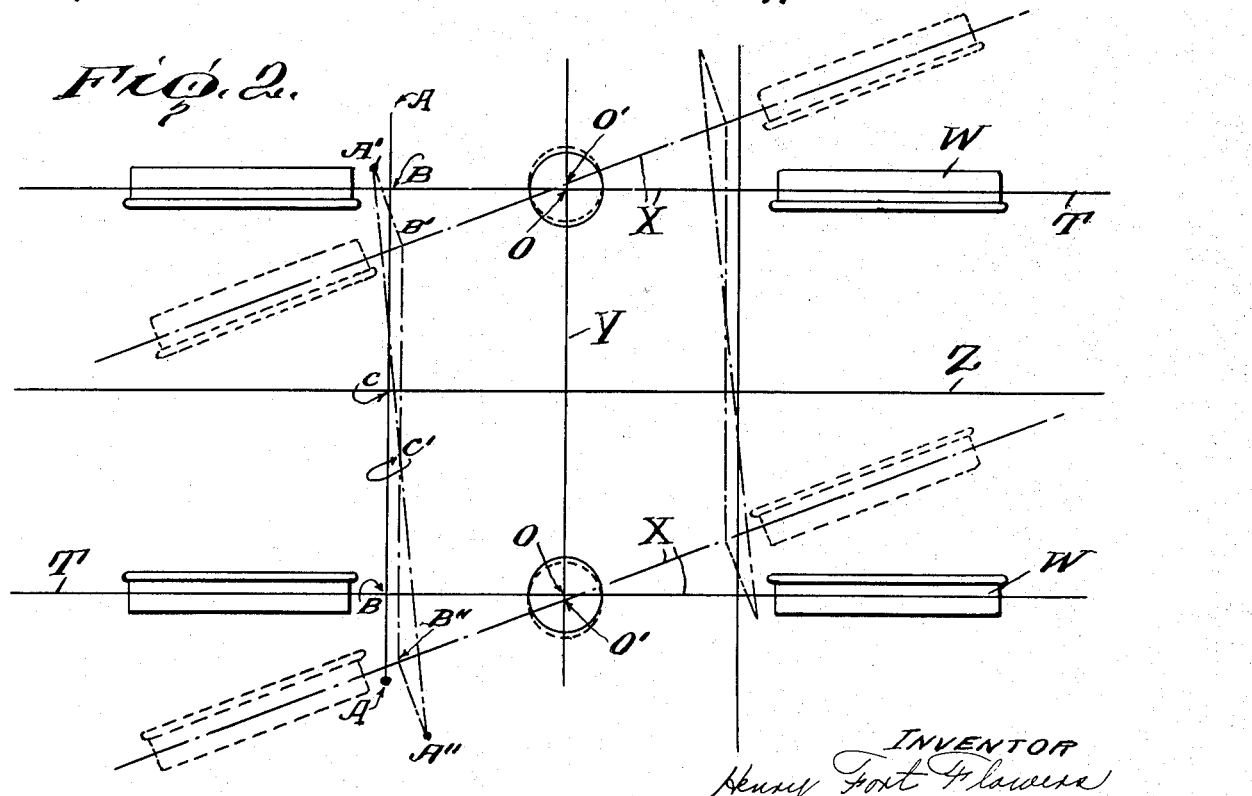
Figure 2 is a diagrammatic plan view illustrating the truck element spreading effect of the tie bar equipments, the relation of the parts during straightaway travel being shown in full lines, and the relation of the parts during the negotiating of the curve being shown in dotted lines.

In Figure 2 of the drawings the relation of these tie bar equipments and the laterally shiftable mountings of the king posts effective to compensate for and minimize the problems of foreshortening are disclosed.

The tandem mounted wheels of the complementary truck elements diagrammatically illustrated in Figure 2 are held to gage by the tie bars 50, and any time that a vertical plane designated by the line Y and passing through the centers of the king posts is not normal to the track at that point (normal meaning perpendicular to the tangent) the effective gage of the wheels is reduced, causing the wheel gage to be narrower than the track gage, and thus producing a foreshortening effect. The tie bars being anchored to the truck frames at points A outside of the track gage lines will force the truck elements outwardly when rounding curves and tend to compensate for this foreshortening, or in other words, tend to cause the wheel gage lines to coincide with the track gage lines in the rounding of the curves. The resilient mounting of the gimbal elements will permit the necessary spreading of the truck elements.

In the diagrammatic illustration in Figure 2, the points A represent the centers of the tie bar anchorages, B represents the points of intersection of the truck element center lines and the line AA drawn through the tie bar anchorage perpendicular to the truck frame center lines, and C represents a point on the center of the tie bar.

On straight line tracks, points A, B and C are in a straight line and the lines AB and BB coincide with the line AA. On a curve, these points are thrown out of line, forming triangles A', B', and C', and A'', B'', and C'', one side of each triangle being formed by the straight line A', A'', and another side of each triangle being formed by the straight line B', B''. The lengths of A', A'', A', B', and A'', B'' are fixed. Therefore, B', B'' must be greater than BB, since the sum of two sides of a triangle must be greater than the third side. Thus, B', B'' are farther apart than points B, B and thus the truck elements are shown to have been spread apart so as to compensate for the foreshortening hereinbefore referred to. During the spreading of the truck elements the king posts centers are moved from 0 to 0' as indicated in Figure 2.

The individual gimbal structures herein disclosed and by which the tandem wheel truck units are mounted on the king posts are specifically claimed in my co-pending application for United States Letters Patent filed May 20, 1939, and identified by Serial Number 274,847.

It is of course to be understood that the details of structure and arrangement of parts may be variously changed and modified without departing from the spirit and scope of my invention.

I claim:

1. In a track travelling vehicle, a pair of bolsters disposed at front and rear in parallel spaced relation, a truck unit pivotally mounted beneath each end of each bolster and overlying the track gage line, a pair of wheels rotatably supported on each truck unit in tandem relation, and a pair of rigid tie bars disposed in generally parallel relation across each pair of bolster associated truck units with the respective truck unit pivots between them, and means effecting fixed pivotal connections at the tie bar ends with the respective pair of bolster associated truck units at points outside the track gage lines thereby to be effective to cause the truck units of the respective pairs to be spread apart slightly by thrust action of said tie bars during rounding of curves whereby the wheel gage lines will be caused to correspond generally with the track gage lines.

2. In a track travelling vehicle, a pair of bolsters disposed at front and rear in parallel spaced relation, a truck unit pivotally mounted beneath each end of each bolster and overlying the track gage line, a pair of wheels rotatably supported on each truck unit in tandem relation, and a pair of rigid tie bars disposed in generally parallel relation across each pair of bolster associated truck units with the respective truck unit pivots between them, means effecting fixed pivotal connections at the tie bar ends with the respective pair of bolster associated truck units at points outside the track gage lines thereby to be effective to cause the truck units of the respective pairs to be spread apart slightly by thrust action of said tie bars during rounding of curves whereby the wheel gage lines will be caused to correspond generally with the track gage lines, and means permitting the truck unit pivot centers to shift outwardly during the spreading apart of said truck units.

3. In a track travelling vehicle, a pair of bolsters disposed at front and rear in parallel spaced relation, a truck unit pivotally mounted beneath each end of each bolster and overlying the track gage line, a pair of wheels rotatably supported on each truck unit in tandem relation, and a pair of rigid tie bars disposed in generally parallel relation across each pair of bolster associated truck units with the respective truck unit pivots between them, means effecting fixed pivotal connections at the tie bar ends with the respective pair of bolster associated truck units at points outside the track gage lines thereby to be effective to cause the truck units of the respective pairs to be spread apart slightly by thrust action of said tie bars during rounding of curves whereby the wheel gage lines will be caused to correspond generally with the track gage lines, said pivotal mountings including rubber insets permitting the truck unit pivot centers to shift outwardly during the spreading apart of said truck units.

4. In a track travelling vehicle, a pair of bolsters disposed at front and rear in parallel spaced relation, a truck unit pivotally mounted beneath each end of each bolster and overlying the track gage line, a pair of wheels rotatably supported on each truck unit in tandem relation, and means effective to spread apart each pair of bolster associated truck units in rounding curves to cause the wheel gage lines to correspond generally with the track gage lines, said means comprising a tie bar connecting across each such pair of truck units inwardly of the wheels at the respective ends and pivotally connected with said truck units at points outside the track gage lines.

5. In a track travelling vehicle, a pair of bolsters disposed at front and rear in parallel spaced relation, a truck unit pivotally mounted beneath each end of each bolster and overlying the track gage line, said pivotal mountings having provision for permitting a degree of lateral and rocking movement of said truck units, a pair of wheels rotatably supported on each truck unit in tandem relation, and means effective to spread apart each pair of bolster associated truck units in rounding curves to cause the wheel gage lines to correspond generally with the track gage lines, said means comprising a tie bar connecting across each such pair of truck units inwardly of the wheels at the respective ends and connected by universal joints with said truck units at points outside the track gage lines.

6. In a track travelling vehicle, a cross bolster, a truck unit pivotally mounted beneath each end of said bolster and overlying the track gage line, a pair of wheels rotatably supported on each truck unit in tandem relation, and means effective to spread apart said truck units in rounding curves to cause the wheel gage lines to correspond generally with the track gage lines, said means comprising a tie bar connecting across said truck units and pivotally connected with said truck units outside the track gage lines.

7. In a track travelling vehicle, a cross bolster, a truck unit pivotally mounted beneath each end of said bolster and overlying the track gage line, said pivotal mountings having provision for permitting a degree of lateral movement of said truck units, a pair of wheels rotatably supported on each truck unit in tandem relation, and means effective to spread apart said truck units in rounding curves to cause the wheel gage lines to correspond generally with the track gage lines, said means comprising a tie bar connecting across said truck units and pivotally connected with said truck units outside the track gage lines.

HENRY FORT FLOWERS.